United States Patent
Wörner

[11] Patent Number: 5,912,441
[45] Date of Patent: Jun. 15, 1999

[54] ABSORPTION/REFLECTION EXHAUST MUFFLER

[75] Inventor: Siegfried Wörner, Esslingen, Germany

[73] Assignee: J. Eberspächer GmbH & Co., Esslingen, Germany

[21] Appl. No.: 08/888,188

[22] Filed: Jul. 3, 1997

[30] Foreign Application Priority Data

Jul. 5, 1996 [DE] Germany .......................... 196 27 079

[51] Int. Cl.⁶ ..................................................... F01N 7/18
[52] U.S. Cl. ............................................ 181/282; 181/256
[58] Field of Search .................................. 181/252, 256, 181/272, 282, 243

[56] References Cited

U.S. PATENT DOCUMENTS

| | | | |
|---|---|---|---|
| 4,972,921 | 11/1990 | Takada et al. | 181/282 |
| 5,581,056 | 12/1996 | Bellgardt et al. | 181/282 |

FOREIGN PATENT DOCUMENTS

| | | |
|---|---|---|
| 0353761 | 2/1990 | European Pat. Off. . |
| 0389401 | 9/1990 | European Pat. Off. . |
| 0 268 728 B1 | 1/1993 | European Pat. Off. . |
| 2 502 693 | 10/1982 | France . |

*Primary Examiner*—Khanh Dang
*Attorney, Agent, or Firm*—McGlew and Tuttle, P.C.

[57] ABSTRACT

An absorption/reflection exhaust muffler of multichamber design with an outer housing and two inner half shells, in which the exhaust gas duct is impressed or pressed in, and which form the inner partitions of the individual chambers. The two inner half shells are designed as a prefabricated, inner half shell system with a bent together edge section, which is pressed in into the outer housing. Compensation of expansion during thermal stresses between the inner half shells and the outer housing is possible as a result. The outer housing may optionally be an outer shell manufactured according to the winding technique, i.e., a wound outer jacket with two flat outer bottoms, or it may comprise two outer half shells manufactured according to the half shell technique.

20 Claims, 2 Drawing Sheets

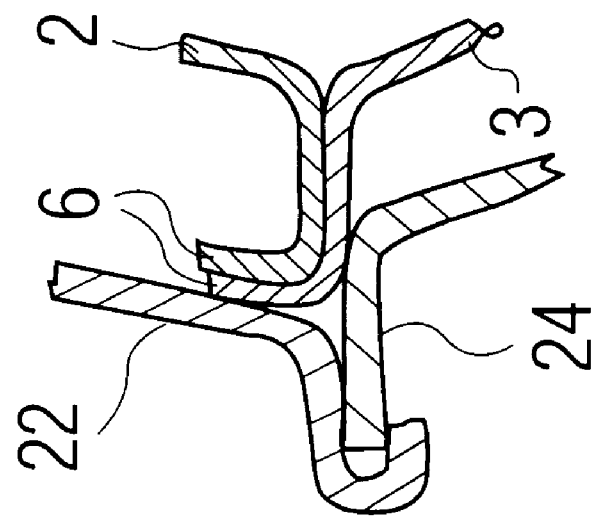
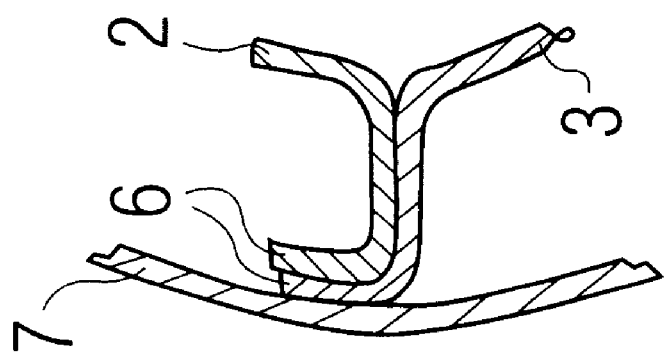

ABSORPTION/REFLECTION EXHAUST MUFFLER

FIELD OF THE INVENTION

The present invention pertains to an absorption/reflection exhaust muffler of multichamber design, with an outer housing and two inner half shells, in which the exhaust gas duct is impressed or pressed in and which form the inner partitions of the individual chambers.

BACKGROUND OF THE INVENTION

An absorption/reflection exhaust muffler of the above-described type has been known from EP 0 268 728 B1, which comprises four half shells—two outer shells and two inner shells—and wherein the four half shells are rigidly connected to one another on the inside and outside by laser welding. The complete functional inner structure with transverse partitions and exhaust gas duct is impressed in the inner half shells.

The drawback of the prior-art exhaust muffler system is the rigid connection of the inner and outer half shells, which are subject to great temperature gradients and consequently high thermal stresses during operation, as a result of which the service life of the exhaust muffler is compromised. The outer housing is made exclusively according to the welded half shell technique.

SUMMARY AND OBJECTS OF THE INVENTION

The primary object of the present invention is to provide an exhaust muffler of the type described in the introduction, which can be manufactured with simple means in a large number of variants and has, in particular, a compensation of the expansion between the inner and outer housings to prevent excessive thermal stresses.

According to the invention, an absorption/reflection exhaust muffler is provided of a multichamber design, with an outer housing and two inner half shells, in which the exhaust gas duct is impressed or pressed in. The two inner half shells form the inner partitions of the individual chambers. The two inner half shells form a prefabricated, inner half shell system and have a bent together edge section, which is impressed into the outer housing.

The essence of the present invention is to design the two inner half shells as a prefabricated inner half shell system with a common, bent edge section, which is pressed into the outer housing for the final assembly of the exhaust muffler. The bent edge section is in a nonpositive, elastic connection with the outer housing and makes possible a compensation of the expansion between the inner and outer housings during the operation of the exhaust muffler, so that thermal stresses can be extensively compensated.

It is especially advantageous that the inner half shell system can be optionally inserted into an outer shell manufactured according to the winding technique, i.e., into a wound outer jacket with two flat outer bottoms, or into two outer half shells manufactured according to the half shell technique, so that a flexible production of the individual parts with a large number of possible variants is possible.

In particular, the edge section, bent together, is an upright edge section, which is pressed into the wound outer jacket of an outer housing and is optionally fixed by tacking points.

The inner half shell system advantageously has spot-welded or Tox-clinched inner half shells.

In an exhaust muffler of a simple, multichamber design, the volume of the exhaust muffler is advantageously divided by the inner half shell system into an upper chamber and a lower chamber, wherein the upper chamber is preferably an absorption chamber, and the lower chamber is a reflection chamber.

The absorption package of the upper chamber may optionally be basalt or Cr wool or an E glass wool filled in automatically.

The outer edges of the inner half shells are arranged especially at a spaced location from the associated outer bottoms of a wound outer housing, the distance being at least about 2 mm.

In a preferred embodiment variant, the exhaust gas duct is designed in the form of half-pipe-like depressions impressed in the inner half shells in an S-shaped manner, wherein an inlet pipe section, a middle pipe section, and an outlet pipe section are provided, and the pipe inlet and the pipe outlet are bound or fixed to the outer housing, especially at the two outer bottoms of a wound outer housing, by welding.

The impressed half-pipe duct of the lower inner half shell is advantageously pulled through downward after the first 180° C. deflection in the middle pipe section over a partial length extending into the vicinity of the outer jacket and is perforated with slots or round holes to draw off condensate in the lowermost area, and it is preferably made without perforation in the outlet pipe section, and in the inlet pipe section it is provided with perforation or with a coupling to the lower reflection chamber.

The impressed half-pipe duct of the upper inner half shell is advantageously perforated with longitudinal or round holes at least in the inlet pipe section and in the middle pipe section, and it is coupled with the upper absorption chamber.

The partition formed by the inner half shells between the upper and lower chambers may be provided, at least partially, with passage openings.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS

In the drawing,

FIG. 4 is an enlarged partially cut-away view of a left hand part of FIG. 3 at the bent edge sections; and FIG. 5 is a view similar to FIG. 4 showing the bent edge sections with an outer housing made of two half-shells.

DESCRIPTION OF THE PREFERRED EMBODIMENT

Figure 1:
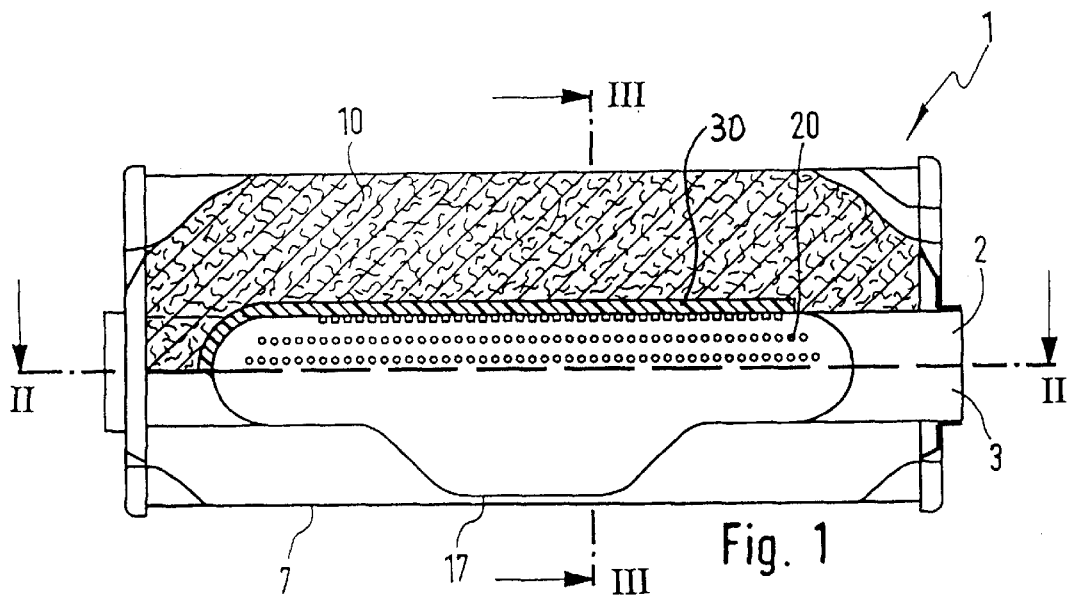
FIG. 1 is a schematic vertical sectional view of an absorption/reflection exhaust muffler.

Referring to the drawings, the invention comprises an absorption/reflection exhaust muffler 1 of a motor vehicle which muffler comprises an outer housing and an inner housing.

The inner housing is arranged essentially horizontally in the outer housing and forms a partition dividing the entire exhaust muffler volume of the outer housing into an upper chamber 4 and a lower chamber 5. An exhaust gas duct is located in the inner housing. The upper chamber 4 is an absorption chamber with an absorption package in the form of basalt/Cr wool or E glass wool. Term E glass or E glass wool which may be used according to the invention is manufactured by excruding a special glass, namely, E glass, by using special excruding nozzles. E glass indicates the chemical composition of the glass and is specified in the German industrial standard number 1259 ("DIN Standard 1259"). E glass is a standard glass for components stressed under industrial conditions, e.g., glass fiber reinforced components, wherein the glass is an aluminoborosilicate glass, in which the weight percentage of alkali is less than one percent. E glass wool is predominantly or preferably all E glass. However, mixtures of glass as well as other glass components are also possible, e.g., A glass, C glass, D glass, etcetera. The lower chamber 5 is a reflection chamber having a cavity.

Figure 2:
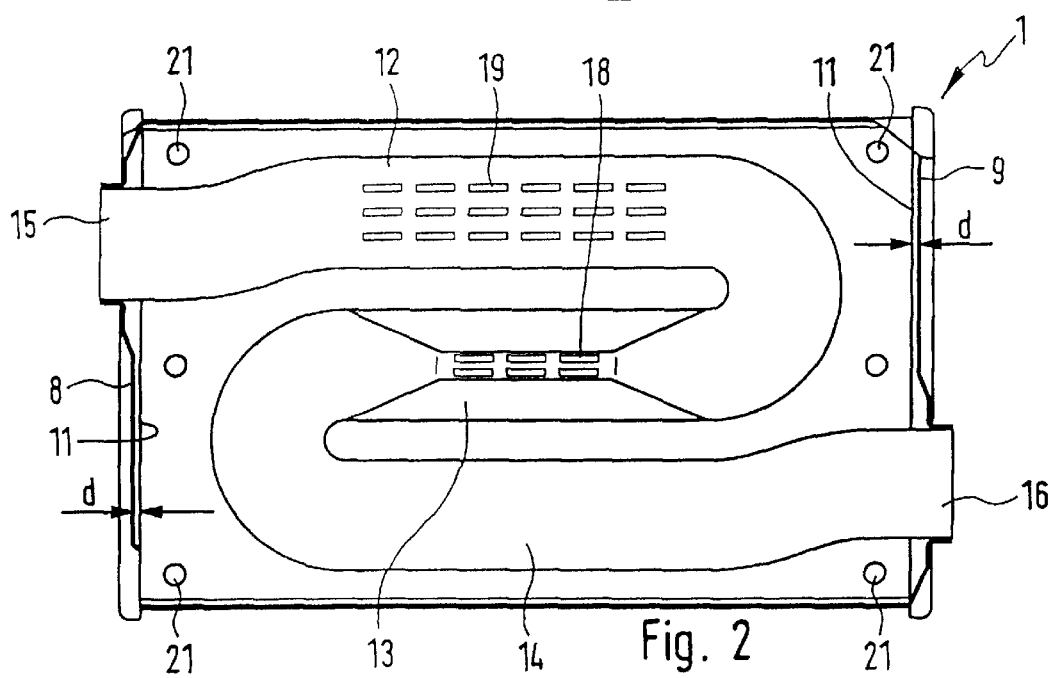
FIG. 2 is a schematic horizontal sectional view of the exhaust muffler according to FIG. 1, taken along line II—II of FIG. 1.

The outer housing is manufactured according to the winding technique (i.e., it is a, wound outer jacket 7 or sheet metal piece with two flat outer bottoms 8, 9 or the outer housing is made with two outer half shells manufactured according to the half shell technique). The outer housing comprises, in particular, a wound outer jacket 7 and two essentially flat outer bottoms 8, 9, while the inner housing has two inner half shells 2, 3 manufactured according to the half shell technique (i.e. two impressed or stamped or otherwise formed parts which are half shells and combine to form a duct, chamber or cavity), in which the exhaust gas duct is impressed or pressed in in each half shell part, in the manner of a half pipe in an S-shaped pattern, as is shown in FIG. 2. The outer housing may in the alternative be based on two half-shell parts 22 and 24 as shown in FIG. 5.

The exhaust gas duct is consequently formed by half-pipe-like depressions impressed in the inner half shells 2, 3 in an S-shaped pattern, wherein an inlet pipe section 12, a middle pipe section 13, and an outlet pipe section 14 are formed. The pipe inlet 15 and the pipe outlet 16 are bound to the two outer bottoms 8, 9 of the wound outer housing by circumferential welding.

The impressed half-pipe duct of the lower inner half shell 3 is pulled through downward after the first 180° deflection in the middle pipe section 13 over a partial length extending into the vicinity of the outer jacket 7, and it is perforated with slots 18 or round holes in the lowermost area to draw off condensate, and it is made without perforation in the outlet pipe section 14. A perforation 19 is provided in the inlet pipe section 12, so that the inlet pipe section 12 is coupled with the lower reflection chamber 5.

Figure 3:
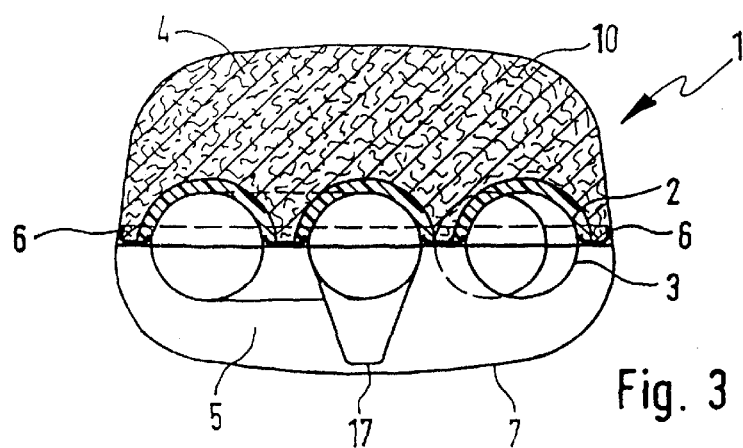
FIG. 3 is a schematic cross sectional view of the exhaust muffler taken along line III—III in FIG. 1.

The impressed half-pipe duct of the upper inner half shell 2 is perforated with elongated or round holes 20 in the inlet pipe section 12 and in the middle pipe section 13 and is coupled with the upper absorption chamber 4. A special intermediate layer 30 is provided between the wool 10 and the upper half shell 2 in FIG. 1 and FIG. 3. The intermediate layer 30 is preferably a chromium steel wool (CR wool), which covers especially the perforations 20 and prevents the basalt wool 10 from being "blown out" or being intrained and from being discharged to the outside through the end pipe 16 of the exhaust muffler by a suction effect during pulsations of the gas during the operation of the exhaust muffler.

The partition formed by the inner half shells 2, 3 between the upper and lower chambers has passage openings 21.

The two inner half shells 2, 3 designed in the above-described manner are spot-welded or Tox-clinched to one another as a prefabricated inner half shell system. With a Tox-clenched fabrication method the two plates are compressed between a (larger) dye and a (smaller) punch during the manufacture of the exhaust muffler to prepare the upper and lower half shells 2,3. The special shape of the inner exhaust gasline of the exhaust muffler is then stamped or formed. If the two plates are "hooked" together at the same time or are connected by folding the edges, these are considered to be Tox-clenched. The half shells 2, 3 have a bent together, upright edge section 6, which is impressed into the wound outer jacket 7 of the outer housing, as is shown especially in FIGS. 3 and 4. The bent edge section 6 is in a nonpositive, elastic connection with the outer housing and permits a compensation of the expansion between the inner and outer housings during operation, so that thermal stresses are extensively compensated. The upright edge section 6 is fixed to the outer jacket 7 by tacking points.

The outer edges 11 of the inner half shells 2, 3 are arranged at a distance d of somewhat greater than 2 mm from the associated outer bottoms 8 and 9, respectively, so that an axial expansion of the inner housing or of the partition in the outer housing is possible. Bulging of the outer bottoms 8, 9, to which the pipe inlet 15 and the pipe outlet 16 are fastened, may possibly take place during the axial expansion of the partition.

While a specific embodiment of the invention has been shown and described in detail to illustrate the application of the principles of the invention, it will be understood that the invention may be embodied otherwise without departing from such principles.

What is claimed is:

1. An absorption/reflection exhaust muffler, comprising:
   an outer housing;
   a first inner half shell with an outer edge section;
   a second inner half shell with an outer edge section;
   an exhaust gas duct formed one of impressed and pressed in said first inner half shell and said second inner half shell respectively, said first inner half shells forming inner partitions to form a multichamber structure with individual chambers, said two inner half shells forming a prefabricated, inner half shell system with said first inner half shell outer edge section abutting said second inner half shell outer edge section to form abutting edge sections which are bent together to provide bent together edge sections which are impressed into the outer housing.

2. The exhaust muffler in accordance with claim 1, wherein said outer housing is formed as an outer shell manufactured according to one of:
   a winding technique with a wound outer jacket with two flat outer bottoms; and
   a half shell technique with two outer half shells.

3. The exhaust muffler in accordance with claim 2, wherein the bent together edge sections of the inner half shell system are provided as a common, upright edge section, which is pressed in in the wound outer jacket of the outer housing and is fixed by tacking points.

4. The exhaust muffler in accordance with claim 1, wherein the inner half shell system has one of spot-welded and Tox-clenched inner half shells.

5. The exhaust muffler in accordance with claim 1, wherein the volume of the exhaust muffler is divided by the inner half shell system into an upper chamber and a lower chamber.

6. The exhaust muffler in accordance with claim 5, wherein the upper chamber is an absorption chamber, and said lower chamber is a reflection chamber.

7. The exhaust muffler in accordance with claim 6, further comprising an absorption package disposed in said upper chamber, said absorption package including one of: basalt/Cr wool; and an E glass wool filled in automatically.

8. The exhaust muffler in accordance with claim 3, wherein said bent together edge sections are arranged at a distance (d) from the associated outer bottoms of a wound outer housing.

9. The exhaust muffler in accordance with claim 8, wherein the distance (d) is at least about 2 mm.

10. The exhaust muffler in accordance with claim 1, wherein the exhaust gas duct is formed by half-pipe-like depressions impressed in said inner half shells in an S-shaped pattern, which form an inlet pipe section with a pipe inlet, a middle pipe section, and an outlet pipe section with a pipe outlet, wherein said pipe inlet and said pipe outlet are bound or fixed by welding to the outer housing at said two outer bottoms of a wound outer housing.

11. The exhaust muffler in accordance with claim 10, wherein the impressed half-pipe duct of said lower inner half shell extends downward after a first 180° deflection in said middle pipe section over a partial length extending into the vicinity of said outer jacket and is perforated with slots or round holes in the said lowermost area to draw off condensate.

12. The exhaust muffler in accordance with claim 10, wherein the impressed half-pipe duct of said lower inner half shell is made without perforations in said outlet pipe section and with perforations or with a coupling with the lower reflection chamber in said inlet pipe section.

13. The exhaust muffler in accordance with claim 10, wherein the impressed half-pipe duct of said upper inner half shell is perforated with elongated or round holes at least in said inlet pipe section and in said middle pipe section and is coupled with the upper absorption chamber.

14. The exhaust muffler in accordance with claim 5, wherein the partition formed by said inner half shells between said upper and lower chambers is provided at least partially with said passage openings.

15. An absorption/reflection exhaust muffler formed by the steps comprising:
forming an outer housing as an outer shell manufactured according to one of:
a winding method with a wound outer jacket with two flat outer bottoms; and
a half shell method with two outer half shells;
forming two inner half shells with an exhaust gas duct one of impressed and pressed in said inner half shells, said inner half shells forming inner partitions to form a multichamber structure with individual chambers, said two inner half shells forming a prefabricated, inner half shell system, said two inner half shells each having an outer edge section with an outer edge of one inner half shell and an outer edge of another inner half shell being bent together to provide bent together edge sections which are impressed into the outer housing.

16. The exhaust muffler in accordance with claim 15, wherein said bent together edge sections form a common, upright edge section, which is pressed in in the outer housing and is fixed by tacking points and the inner half shell system has one of spot-welded and Tox-clenched inner half shells, wherein the volume of the exhaust muffler is divided by the inner half shell system into an upper chamber and a lower chamber and said upper chamber is an absorption chamber, and said lower chamber is a reflection chamber and further comprising an absorption package disposed in said upper chamber, said absorption package including one of: basalt/Cr wool; and an E glass wool filled in automatically and the partition formed by said inner half shells between said upper and lower chambers is provided at least partially with said passage openings.

17. The exhaust muffler in accordance with claim 16, wherein said outer edges of said inner half shells are arranged at a distance from the associated outer bottoms of a wound outer housing, wherein the distance (d) is at least about 2 mm.

18. The exhaust muffler in accordance with claim 15, wherein the exhaust gas duct is formed by half-pipe-like depressions impressed in said inner half shells in an S-shaped pattern, which form an inlet pipe section with a pipe inlet, a middle pipe section, and an outlet pipe section with a pipe outlet, wherein said pipe inlet and said pipe outlet are bound or fixed by welding to the outer housing at said two outer bottoms of a wound outer housing.

19. The exhaust muffler in accordance with claim 18, wherein the impressed half-pipe duct of said lower inner half shell extends downward after a first 180° deflection in said middle pipe section over a partial length extending into the vicinity of said outer jacket and is perforated with slots or round holes in the said lowermost area to draw off condensate.

20. The exhaust muffler in accordance with claim 18, wherein the impressed half-pipe duct of said lower inner half shell is made without perforations in said outlet pipe section and with perforations or with a coupling with the lower reflection chamber in said inlet pipe section and the impressed half-pipe duct of said upper inner half shell is perforated with elongated or round holes at least in said inlet pipe section and in said middle pipe section and is coupled with the upper absorption chamber.

* * * * *